United States Patent
Choi et al.

(10) Patent No.: US 11,355,760 B2
(45) Date of Patent: Jun. 7, 2022

(54) METHOD OF MANUFACTURING ELECTROLYTE MEMBRANE FOR FUEL CELLS HAVING IMPROVED DURABILITY

(71) Applicants: HYUNDAI MOTOR COMPANY, Seoul (KR); KIA MOTORS CORPORATION, Seoul (KR)

(72) Inventors: Jin Yi Choi, Yongin-si (KR); Min Kyung Kim, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 17/026,474

(22) Filed: Sep. 21, 2020

(65) Prior Publication Data
US 2021/0184222 A1    Jun. 17, 2021

(30) Foreign Application Priority Data
Dec. 11, 2019    (KR) .................. 10-2019-0164234

(51) Int. Cl.
| | | |
|---|---|---|
| *H01M 4/88* | (2006.01) | |
| *H01M 4/86* | (2006.01) | |
| *H01M 8/1062* | (2016.01) | |
| *H01M 8/0245* | (2016.01) | |
| *H01M 8/1004* | (2016.01) | |

(Continued)

(52) U.S. Cl.
CPC ......... *H01M 4/881* (2013.01); *H01M 4/8605* (2013.01); *H01M 4/8657* (2013.01); *H01M 4/8807* (2013.01); *H01M 4/8828* (2013.01); *H01M 4/921* (2013.01); *H01M 8/0245* (2013.01); *H01M 8/1004* (2013.01); *H01M 8/1007* (2016.02); *H01M 8/1039* (2013.01); *H01M 8/1062* (2013.01)

(58) Field of Classification Search
CPC ............. H01M 4/8605; H01M 4/8657; H01M 4/8807; H01M 4/881; H01M 4/8828; H01M 4/921; H01M 50/211; H01M 50/247; H01M 50/517; H01M 50/519; H01M 8/0245; H01M 8/1004; H01M 8/1007; H01M 8/1039; H01M 8/1062; Y02E 60/50; Y02P 70/50
See application file for complete search history.

(56) References Cited

U.S. PATENT DOCUMENTS

| | | | | |
|---|---|---|---|---|
| 2008/0020261 A1* | 1/2008 | Hendricks | ........... | H01M 8/1004 429/431 |
| 2013/0202986 A1* | 8/2013 | Moose | ................ | H01M 8/1058 429/482 |
| 2017/0309930 A1* | 10/2017 | Kim | ........................ | B29C 53/56 |

FOREIGN PATENT DOCUMENTS

| | | |
|---|---|---|
| KR | 10-1081712 B1 | 11/2011 |
| KR | 10-1669236 B1 | 10/2016 |

* cited by examiner

*Primary Examiner* — Victoria H Lynch
(74) *Attorney, Agent, or Firm* — McDonnell Boehnen Hulbert & Berghoff LLP

(57) ABSTRACT

The present disclosure relates to a method of manufacturing an electrolyte membrane for fuel cells capable of effectively removing hydrogen and/or air crossing over. Specifically, the method includes coating a slurry including at least an ionomer on a substrate to manufacture an ion transfer layer, manufacturing a laminate including the substrate and the ion transfer layer, and providing a pair of laminates to form an electrolyte membrane, wherein the ion transfer layer has a catalyst region formed at one side thereof based on a width-direction center line thereof, the catalyst region including a catalyst.

13 Claims, 10 Drawing Sheets

(51) Int. Cl.
*H01M 8/1007* (2016.01)
*H01M 8/1039* (2016.01)
*H01M 4/92* (2006.01)

METHOD OF MANUFACTURING ELECTROLYTE MEMBRANE FOR FUEL CELLS HAVING IMPROVED DURABILITY

CROSS REFERENCE TO RELATED APPLICATIONS

This application claims, under 35 U.S.C. § 119(a), the benefit of priority to Korean Patent Application No. 10-2019-0164234 filed on Dec. 11, 2019, the entire contents of which are incorporated herein by reference.

BACKGROUND

(a) Technical Field

The present disclosure relates to a method of manufacturing an electrolyte membrane for fuel cells capable of effectively removing hydrogen and/or air crossing over.

(b) Background Art

In general, a polymer electrolyte membrane fuel cell (PEMFC) is used as a fuel cell for vehicles. In order for the polymer electrolyte membrane fuel cell to normally exhibit a high output performance of at least several tens of kW under various driving conditions of a vehicle, the polymer electrolyte membrane fuel cell must be stably operated within a wide range of current density.

Reaction for generation of electricity in the fuel cell occurs at a membrane-electrode assembly (MEA) including a perfluorinated sulfonic acid (PFSA) ionomer-based electrolyte membrane and an anode/cathode. Hydrogen supplied to the anode, which is an oxidation electrode, is divided into protons and electrons. The protons move to the cathode, which is a reduction electrode, through the membrane, and the electrons move to the cathode through an external circuit. At the cathode, oxygen molecules, the protons, and the electrons react with each other to generate electricity, and water ($H_2O$) and heat are generated as reaction byproducts.

Hydrogen and air (oxygen), which are reaction gases of the fuel cell, may cross over in the electrolyte membrane. At this time, hydrogen peroxide (HOOH) may be generated. When the hydrogen peroxide (HOOH) is decomposed into oxygen-containing radicals, such as a hydroxyl radical (.OH) and a hydroperoxylradical (.OOH), the radicals attack the electrolyte membrane, whereby chemical degradation of the electrolyte membrane is caused and eventually durability of the fuel cell is reduced.

In order to solve the above problem, research on a method of adding a noble-metal-based catalyst, such as platinum (Pt), to an electrolyte membrane to remove hydrogen and air (oxygen) crossing over through reaction into water has been conducted in recent years.

The above information disclosed in this Background section is provided only for enhancement of understanding of the background of the disclosure and therefore it may contain information that does not form the prior art that is already known in this country to a person of ordinary skill in the art.

SUMMARY

The present disclosure has been made in an effort to solve the above-described problems associated with the prior art.

It is an object of the present disclosure to provide a method capable of maintaining durability of an electrode membrane so as to be equal to or higher than durability of a conventional electrode membrane while reducing the amount of a noble-metal-based catalyst, such as platinum, that is used.

The objects of the present disclosure are not limited to those described above. The objects of the present disclosure will be clearly understood from the following description and could be implemented by means defined in the claims and a combination thereof.

In one aspect, the present disclosure provides a method of manufacturing an electrolyte membrane for fuel cells, the method including coating slurry including at least an ionomer on a substrate to manufacture an ion transfer layer, manufacturing a laminate including the substrate and the ion transfer layer, and providing a pair of laminates to form an electrolyte membrane, wherein the ion transfer layer has a catalyst region formed in at least one side thereof based on a width-direction center line thereof, the catalyst region including a catalyst.

The catalyst region may be formed from one end of the ion transfer layer to a boundary line spaced apart from the one end toward the width-direction center line by a predetermined distance.

The width of the catalyst region may be equal to or less than ½ of the width of the ion transfer layer.

The ion transfer layer may be manufactured using a die coater, and slurry including an ionomer and a catalyst may be discharged through a portion of a nozzle of a die head provided in the die coater in order to form the catalyst region.

The catalyst may include one selected from the group consisting of platinum (Pt), gold (Au), palladium (Pd), silver (Ag), osmium (Os), iridium (Ir), ruthenium (Ru), and a combination thereof.

The substrate may include release paper selected from the group consisting of polyethylene terephthalate (PET), polyethylene naphthalate (PEN), polytetrafluoroethylene (PTFE), polyimide (PI), polypropylene (PP), and a combination thereof.

The pair of laminates may be provided such that the catalyst regions included in the ion transfer layers are located at opposite regions in order to form the electrolyte membrane.

The pair of laminates may be provided such that the catalyst regions included in the ion transfer layers are located at the same regions in order to form the electrolyte membrane.

The laminates may be wound around rolls, wherein an outer surface roll on which the ion transfer layer is wound so as to face outwards and an inner surface roll on which the ion transfer layer is wound so as to face inwards may be prepared, and the ion transfer layers contact each other, whereby the catalyst regions are located at the same regions.

A first ion transfer layer having a catalyst region formed at the one side thereof based on the width-direction center line thereof and a second ion transfer layer having a catalyst region formed at the other side thereof based on the width-direction center line thereof may be formed, and the first ion transfer layer and the second ion transfer layer may be laminated so as to contact each other such that the catalyst regions are located at the same regions.

The method may further include providing a porous reinforcement layer on the ion transfer layer such that the ion transfer layer is impregnated with the reinforcement layer.

The reinforcement layer may include one selected from the group consisting of polytetrafluoroethylene (PTFE), expanded polytetrafluoroethylene (e-PTFE), polyethylene (PE), polypropylene (PP), polyphenylene oxide (PPO), polybenzimidazole (PBI), polyimide (PI), polyvinylidene fluoride (PVdF), polyvinyl chloride (PVC), and a combination thereof.

In another aspect, the present disclosure provides a method of manufacturing a fuel cell, the method including forming electrode layers on opposite surfaces of the electrolyte membrane to obtain a membrane-electrode assembly and coupling the membrane-electrode assembly and a gasket to each other such that the catalyst regions of the electrolyte membrane are located at hydrogen inlet and air inlet sides.

BRIEF DESCRIPTION OF THE FIGURES

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
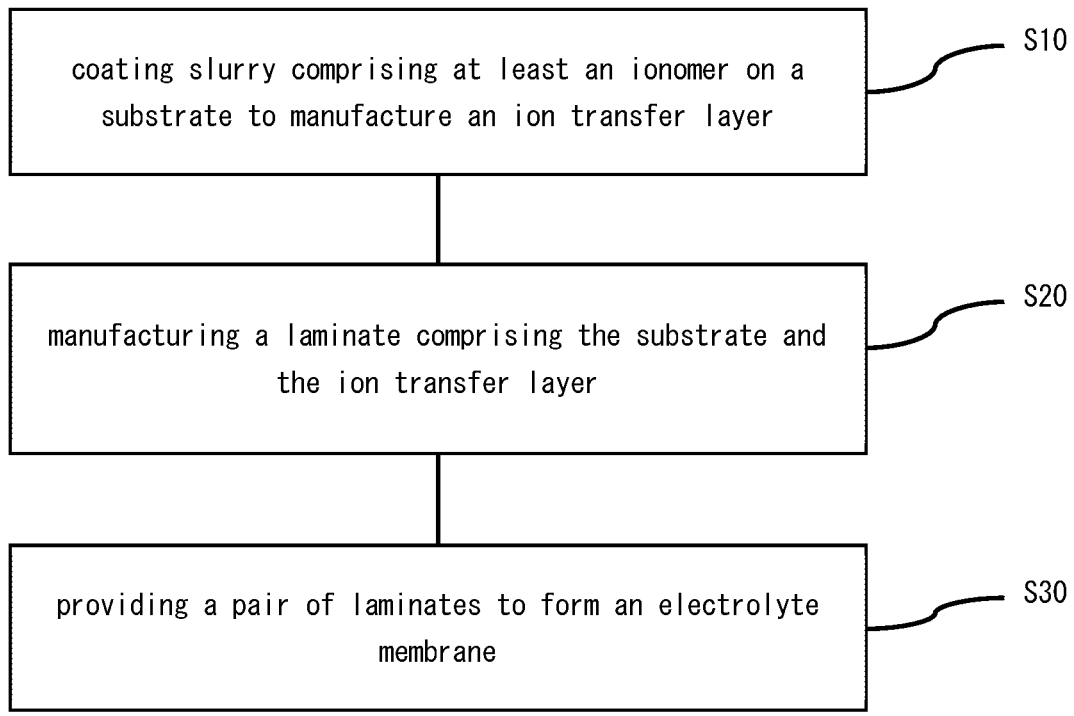
FIG. 1 is a flowchart showing a method of manufacturing an electrolyte membrane for fuel cells according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The objects described above, and other objects, features and advantages will be clearly understood from the following preferred embodiments with reference to the attached drawings. However, the present disclosure is not limited to the embodiments and will be embodied in different forms. The embodiments are suggested only to offer thorough and complete understanding of the disclosed contents and sufficiently inform those skilled in the art of the technical concept of the present disclosure.

Like reference numbers refer to like elements throughout the description of the figures. In the drawings, the sizes of structures are exaggerated for clarity. It will be understood that, although the terms "first", "second", etc. may be used herein to describe various elements, corresponding elements should not be understood to be limited by these terms, which are used only to distinguish one element from another. For example, within the scope defined by the present disclosure, a first element may be referred to as a second element and similarly, a second element may be referred to as a first element. Singular forms are intended to include plural forms as well, unless the context clearly indicates otherwise.

It will be further understood that the terms "comprises", "has" and the like, when used in this specification, specify the presence of stated features, numbers, steps, operations, elements, components or combinations thereof, but do not preclude the presence or addition of one or more other features, numbers, steps, operations, elements, components, or combinations thereof. In addition, it will be understood that, when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless the context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all numbers, figures and/or expressions. In addition, when numeric ranges are disclosed in the description, these ranges are continuous and include all numbers from the minimum to the maximum including the maximum within the range unless otherwise defined. Furthermore, when the range refers to an integer, it includes all integers from the minimum to the maximum including the maximum within the range, unless otherwise defined.

FIG. 1 is a flowchart showing a method of manufacturing an electrolyte membrane for fuel cells according to the present disclosure. Referring to this, the method includes coating slurry including at least an ionomer on a substrate to manufacture an ion transfer layer at S10, manufacturing a laminate including the substrate and the ion transfer layer at S20, and providing a pair of laminates to form an electrolyte membrane at S30.

Figure 2A:
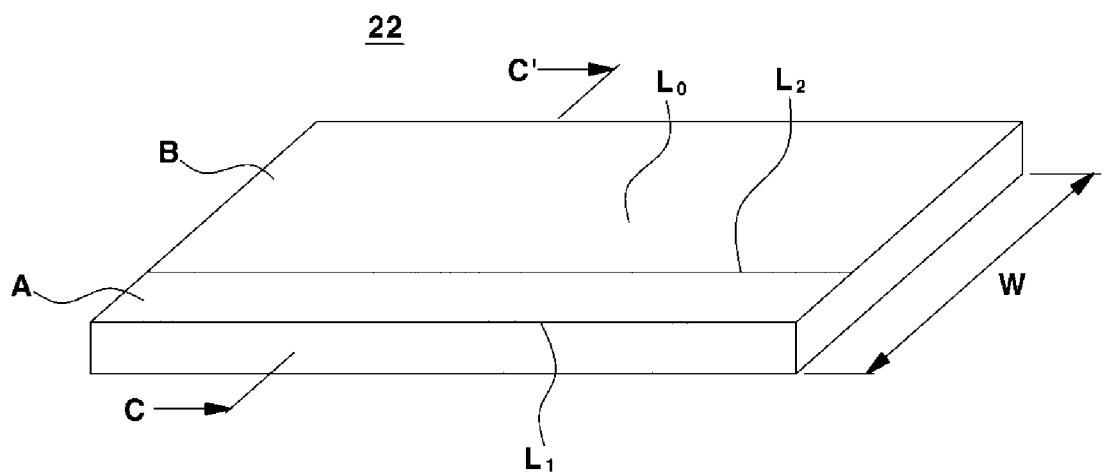
FIG. 2A is a perspective view schematically showing an ion transfer layer according to the present disclosure.

FIG. 2A is a perspective view schematically showing an ion transfer layer 22 according to the present disclosure.

Figure 2B:
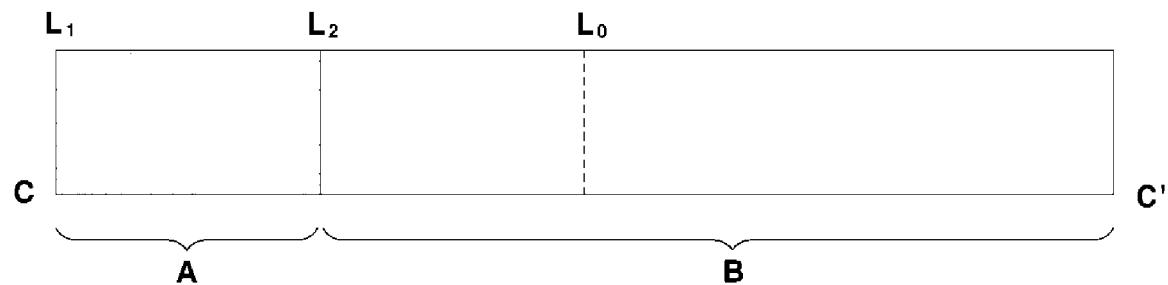
FIG. 2B is a sectional view taken along line C-C' of FIG. 2A.

FIG. 2B is a sectional view taken along line C-C' of FIG. 2A. Referring to these, the ion transfer layer 22 may have a catalyst region A formed at one side thereof based on a width-direction center line $L_0$ thereof, the catalyst region A including a catalyst. The catalyst region A includes not only the surface of the ion transfer layer 22 but also a thickness-direction interior of the ion transfer layer 22. The width-direction center line $L_0$ is an imaginary line formed by interconnecting width-direction central points at specific points of the ion transfer layer 22. In addition, the width-direction center line $L_0$ may be a width-direction center line of a laminate 20, a description of which will follow. In this case, the width-direction center line $L_0$ may an imaginary line formed by interconnecting width-direction central points at specific points of the laminate 20.

The remaining portion of the ion transfer layer 22, excluding the catalyst region A, is referred to as a non-catalyst region B. In FIG. 2A, the catalyst region A and the non-catalyst region B are very clearly partitioned from each other by a straight line, which, however, is provided for convenience of understanding. Both regions may be partitioned from each other as shown in FIG. 2B, or may be partitioned from each other along a gently fluctuated profile, or may be somewhat unclearly partitioned from each other while the catalyst has a concentration gradient. The ion transfer layer 22 according to the present disclosure has a catalyst region A formed at one side thereof based on the width-direction center line $L_0$ thereof. Various forms satisfying this fall within the scope of the present disclosure.

The catalyst region A may be formed from one end $L_1$ of the ion transfer layer 22 to a boundary line $L_2$ spaced apart from the end $L_1$ toward the width-direction center line $L_0$ by a predetermined distance. In this case, the width of the catalyst region A, i.e. the distance from the end $L_1$ to the boundary line $L_2$, may be ½ or less of the width W of the ion transfer layer 22. If the width of the catalyst region A exceeds ½ of the width W of the ion transfer layer 22, it is difficult to maximize the effect of reducing the amount of the catalyst that is used.

Figure 3:
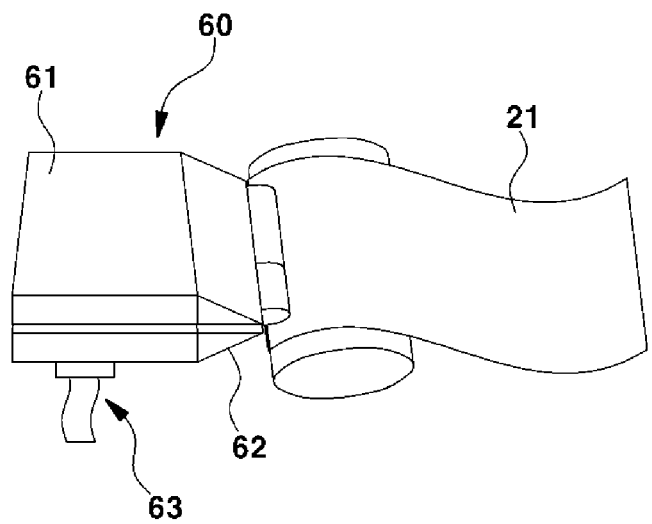
FIG. 3 is a view schematically showing a die coater usable in the present disclosure.

The ion transfer layer 22 may be manufactured using a die coater. FIG. 3 is a view schematically showing the die coater 60. Referring to FIG. 3, a slurry including a catalyst and an ionomer is discharged onto a substrate 21 through a portion of a nozzle 62 of a die head 61 provided in the die coater 60, and at the same time slurry including at least an ionomer is discharged onto the substrate 21 through the remaining portion of the nozzle 62, whereby an ion transfer layer 22 having the catalyst region A and the non-catalyst region B may be manufactured.

The concrete means is not particularly restricted. A plurality of slurry introduction parts 63 may be arranged in a width direction of the substrate 21, and slurry including a catalyst and an ionomer may be introduced into some of the slurry introduction parts 63 in order to form the catalyst region A.

The catalyst is not particularly restricted as long as the catalyst is sufficiently active to react hydrogen and air crossing over in the electrolyte membrane with each other. For example, the catalyst may include one element selected from the group consisting of platinum (Pt), gold (Au), palladium (Pd), silver (Ag), osmium (Os), iridium (Ir), ruthenium (Ru), and a combination thereof.

The ionomer may include a polymer having a proton conductive functional group. The proton conductive functional group may include sulfonic acid, sulfonate, carboxylic acid, carboxylate, phosphoric acid, and phosphate. For example, the ionomer may include a perfluorinatedsulfonic acid ionomer (PFSA) including the proton conductive functional group.

The slurry forming the non-catalyst region B may include at least an ionomer, and may further include an antioxidant. For example, the antioxidant may include cerium- or terephthalic acid-based antioxidants, such as cerium oxide or ceria and cerium (III) nitrate hexahydrate. The antioxidant is added to the non-catalyst region B, in which the catalyst is not present, in order to process a very small amount of gas that has not been removed from the catalyst region A.

The substrate 21 may include release paper selected from the group consisting of polyethylene terephthalate (PET), polyethylene naphthalate (PEN), polytetrafluoroethylene (PTFE), polyimide (PI), polypropylene (PP), and a combination thereof.

Figure 4:
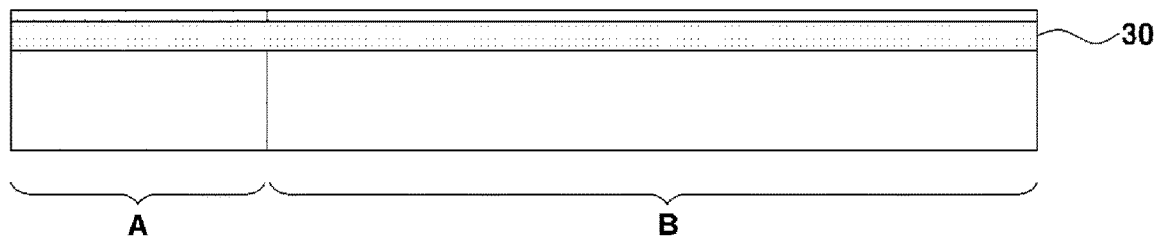
FIG. 4 is a sectional view showing another embodiment of the ion transfer layer according to the present disclosure.

FIG. 4 is a sectional view showing another embodiment of the ion transfer layer 22 according to the present disclosure. A porous reinforcement layer 30 may be inserted into the ion transfer layer 22. Consequently, the method may further include providing the porous reinforcement layer 30 on the ion transfer layer 22 such that the ion transfer layer 22 is impregnated with the reinforcement layer 30.

The reinforcement layer 30 is provided to increase mechanical rigidity of the electrolyte membrane. The reinforcement layer 30 may include one material selected from the group consisting of polytetrafluoroethylene (PTFE), expanded polytetrafluoroethylene (e-PTFE), polyethylene (PE), polypropylene (PP), polyphenylene oxide (PPO), polybenzimidazole (PBI), polyimide (PI), polyvinylidene fluoride (PVdF), polyvinyl chloride (PVC), and a combination thereof, and may be a porous membrane having a plurality of pores.

The size of the pores of the reinforcement layer 30 may be larger than the size of particles of the catalyst, the ionomer, and the antioxidant such that the reinforcement layer 30 can be impregnated with the catalyst and the antioxidant.

A laminate 20 obtained by forming the ion transfer layer 22 on the substrate 21 may be wound at S20. A pair of wound rolls, each of which is obtained by winding the laminate 20 around a roll, etc., may be prepared, the rolls may be laminated such that the ion transfer layers 22 of the laminates 20 face each other, and the substrates 21 may be removed in order to manufacture an electrolyte membrane 10 at S30. Hereinafter, the above steps will be described in detail.

In the method, first, a pair of laminates 20 and 20' is provided such that catalyst regions A and A' included in ion transfer layers 22 and 22' are located at opposite regions in order to form an electrolyte membrane 10, as shown in FIGS. 5A to 5D.

Figure 5A:
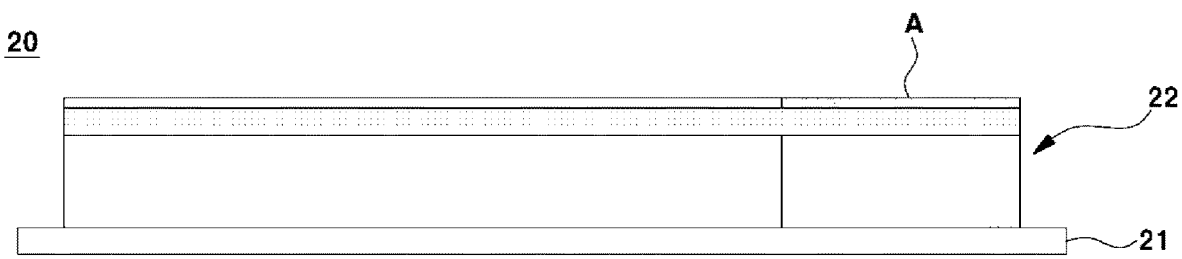
FIGS. 5A, 5B, 5C, and 5D are reference views illustrating a first embodiment of the method of manufacturing the electrolyte membrane for fuel cells according to the present disclosure.
Figure 5B:
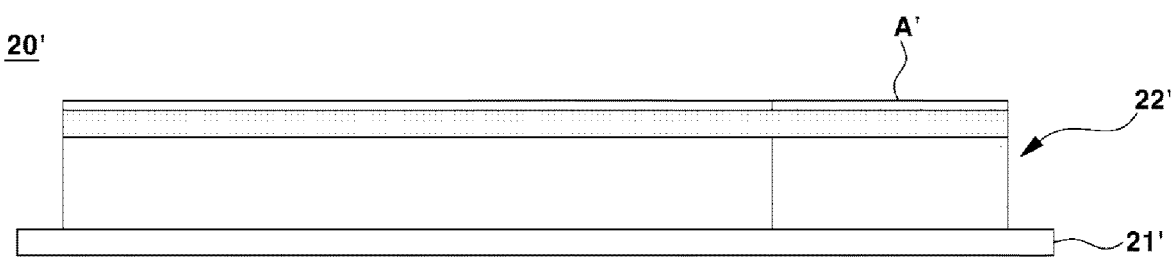

Specifically, first, laminates 20 and 20' having ion transfer layers 22 and 22' formed on substrates 21 and 21' may be prepared, as shown in FIGS. 5A and 5B. Although the sections of the laminates 20 and 20' are shown in FIGS. 5A and 5B for convenience of description, each of the laminates 20 and 20' may be provided in the form of a roll.

Figure 5C:
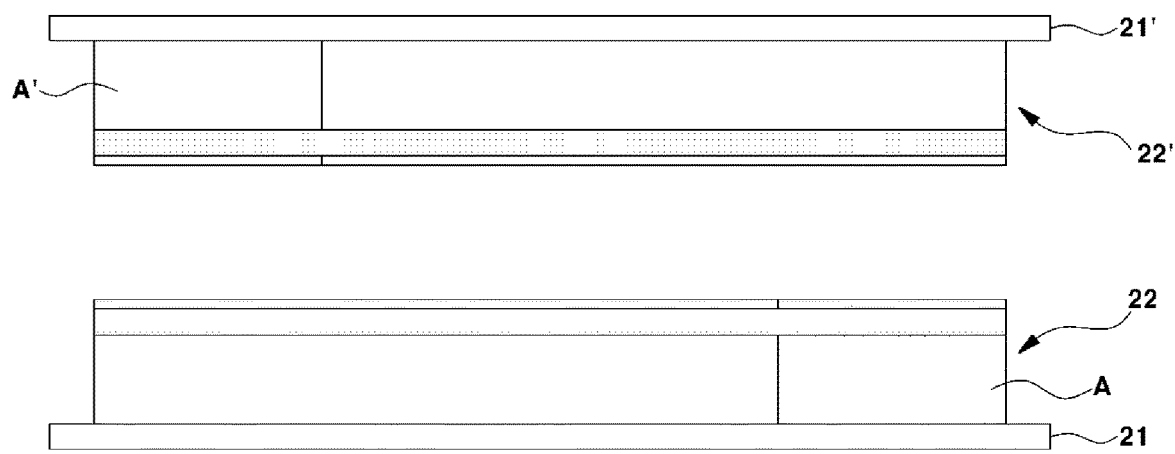
Figure 5D:
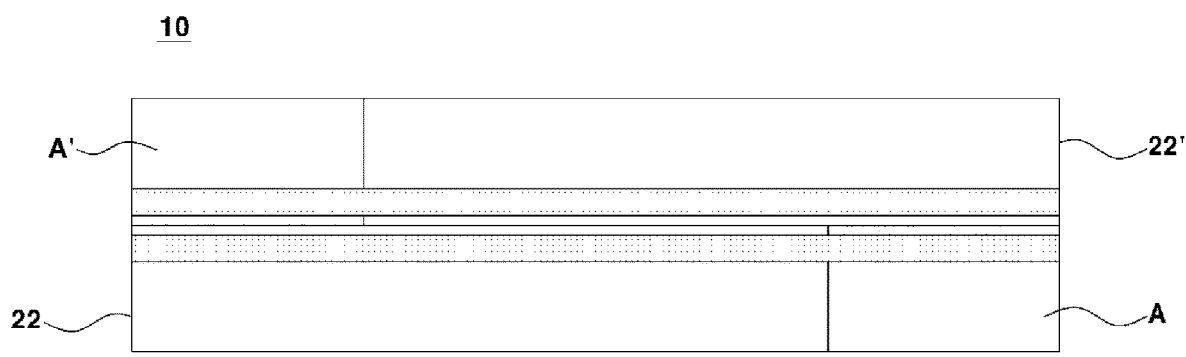

Subsequently, the laminates 20 and 20' may be located such that the ion transfer layers 22 and 22' face each other, as shown in FIG. 5C, and may be transferred while substrates 21 and 21' are removed to obtain an electrolyte membrane 10, as shown in FIG. 5D.

Referring to FIG. 5D, it can be seen that the catalyst regions A and A' are located at opposite regions of the electrolyte membrane 10.

A method of manufacturing a fuel cell according to the present disclosure may include forming electrodes on opposite surfaces of the electrolyte membrane 10 manufactured using the method shown in FIGS. 5A to 5D to obtain a membrane-electrode assembly and coupling the membrane-electrode assembly and a gasket to each other such that the catalyst regions A and A' of the electrolyte membrane 10 are located at hydrogen inlet and air inlet sides.

In the fuel cell, the amount of gas crossing over is largest at the hydrogen inlet and air inlet sides, and the electrolyte membrane is most severely degraded at the hydrogen inlet and air inlet sides. The present disclosure is technically characterized in that a catalyst is locally added to the electrolyte membrane at the hydrogen inlet and air inlet sides, whereby the maximum effect is achieved using a minimum amount of the catalyst, i.e. durability of the electrolyte membrane is maximized.

Figure 6A:
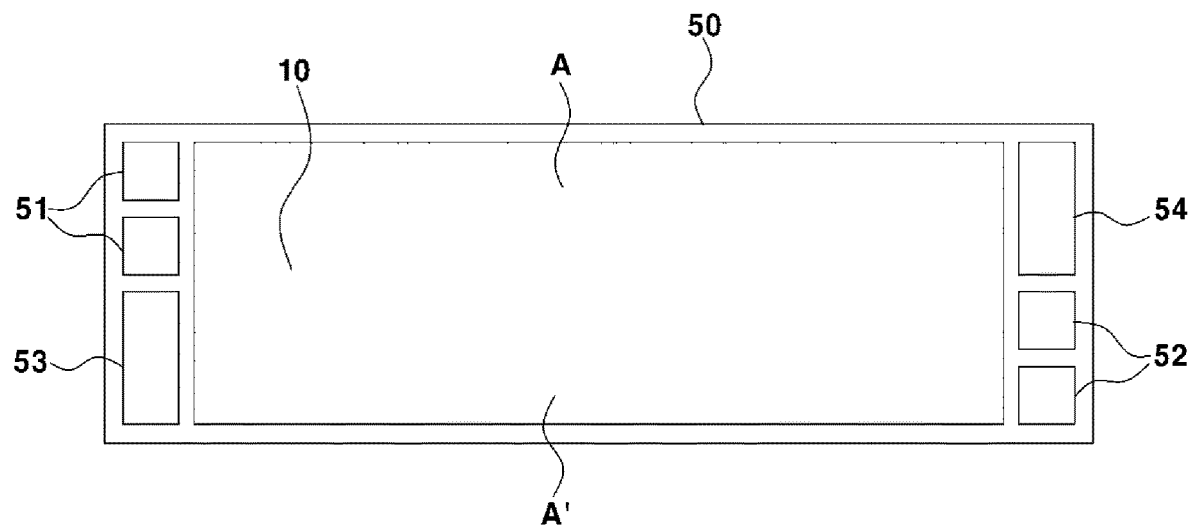
FIG. 6A is a plan view showing a fuel cell obtained using the electrolyte membrane manufactured according to the first embodiment.
Figure 6B:
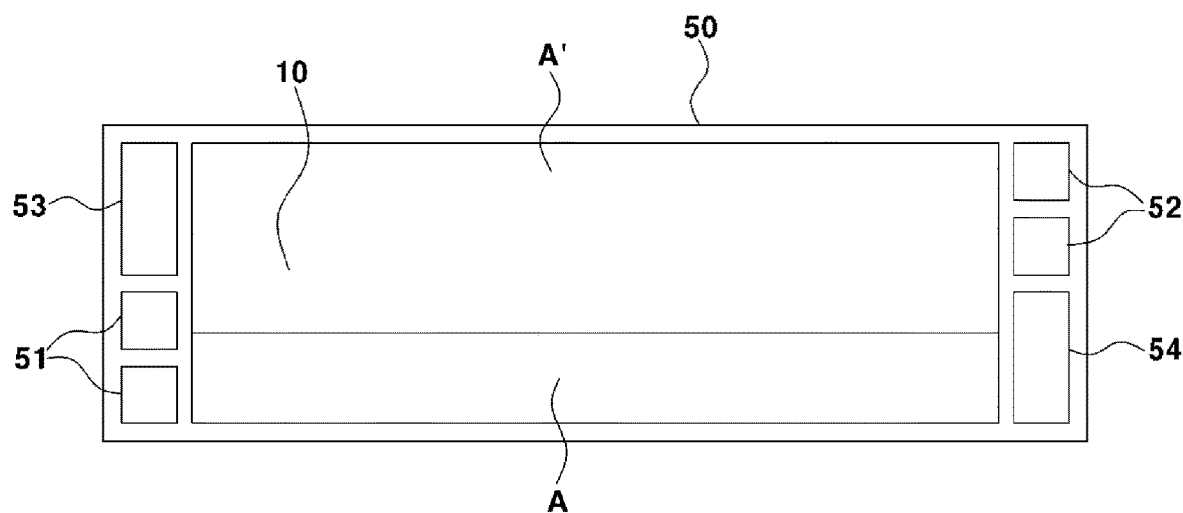
FIG. 6B is a bottom view of the fuel cell.

FIG. 6A is a plan view of the fuel cell, and FIG. 6B is a bottom view of the fuel cell. For convenience of description, the electrodes are omitted, and only the electrolyte membrane 10 and the gasket 50 are shown. In addition, the catalyst region A of FIG. 6A and the catalyst region A' of FIG. 6B are also shown in the plan view and the bottom view, although the catalyst regions are not exposed. The sectional view of FIG. 5D aids in understanding the structure of the electrolyte membrane of FIGS. 6A and 6B. Referring to FIG. 6A, it can be seen that the catalyst region A' is located at the air inlet 53 side. Referring to FIG. 6B, it can be seen that the catalyst region A is located at the hydrogen inlet 51 side.

In a method shown in FIGS. 7A to 7D, a pair of laminates 20 and 20' is provided such that catalyst regions A and A' included in ion transfer layers 22 and 22' are located at the same regions in order to form an electrolyte membrane 10.

Figure 7A:
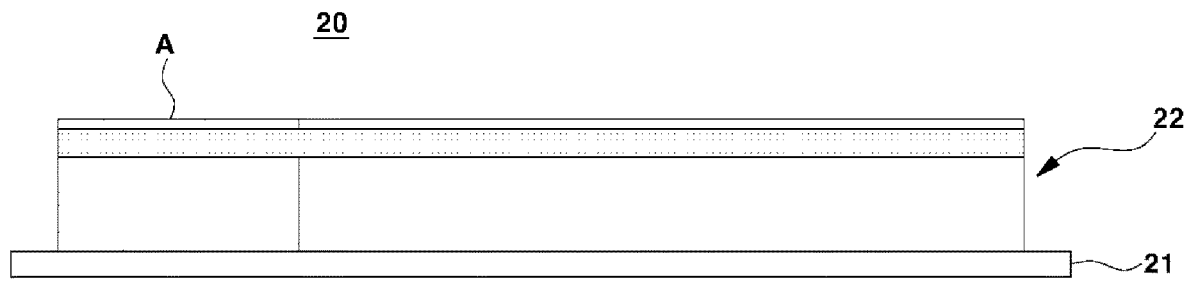
FIGS. 7A, 7B, 7C, and 7D are reference views illustrating a second embodiment of the method of manufacturing the electrolyte membrane for fuel cells according to the present disclosure.

Specifically, first, a laminate 20 having an ion transfer layer 22 formed on a substrate 21 may be prepared, as shown in FIG. 7A. The laminate 20 may be wound around a roll, and an outer surface roll 41 on which the ion transfer layer 22 is wound so as to face outwards and an inner surface roll 42 on which the ion transfer layer 22 is wound so as to face inwards may be prepared.

Figure 7B:
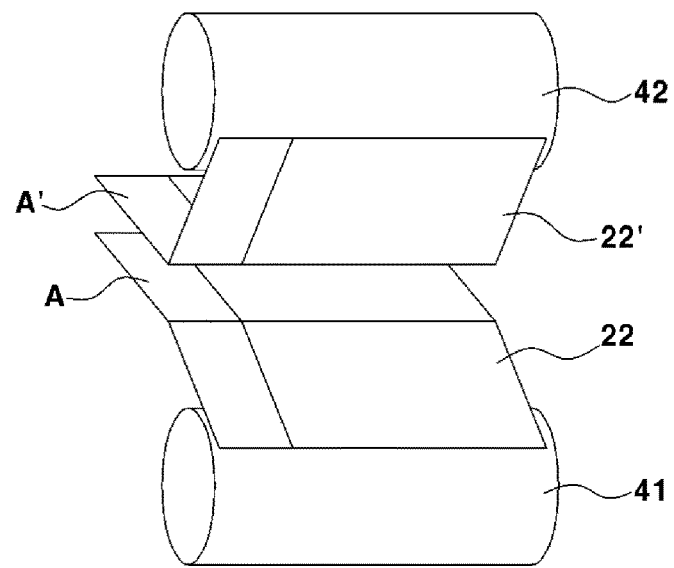

Subsequently, the outer surface roll 41 and the inner surface roll 42 are located, as shown in FIG. 7B, and the wound rolls may be laminated such that the ion transfer layers 22 and 22' contact each other. FIG. 7B shows only a portion of each of the ion transfer layers 22 and 22' unwound from the wound rolls for lamination, and the substrate is removed from the inner surface roll 42 for lamination.

Figure 7C:
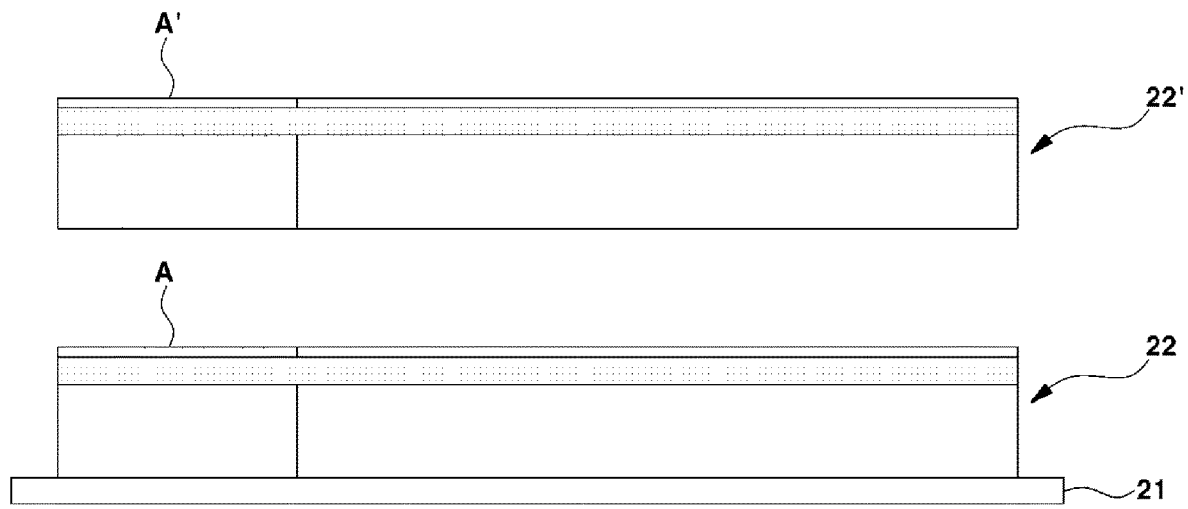

That is, both wound rolls 41 and 42 are arranged, as shown in FIG. 7B, so as to be disposed in the state shown in FIG. 7C. In this state, both wound rolls are transferred while the substrate 21 is removed in order to obtain the electrolyte membrane 10, as shown in FIG. 7D.

Figure 7D:
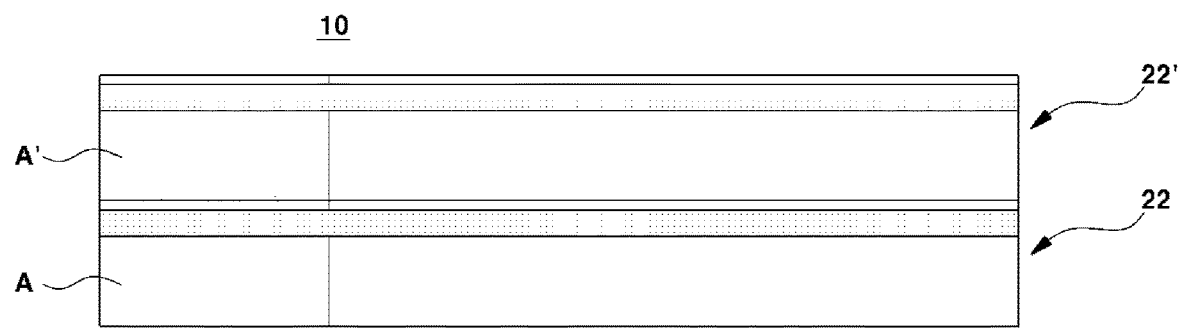

Referring to FIG. 7D, it can be seen that the catalyst regions A and A' of the electrolyte membrane 10 are located at regions oriented in the same direction.

Figure 8A:
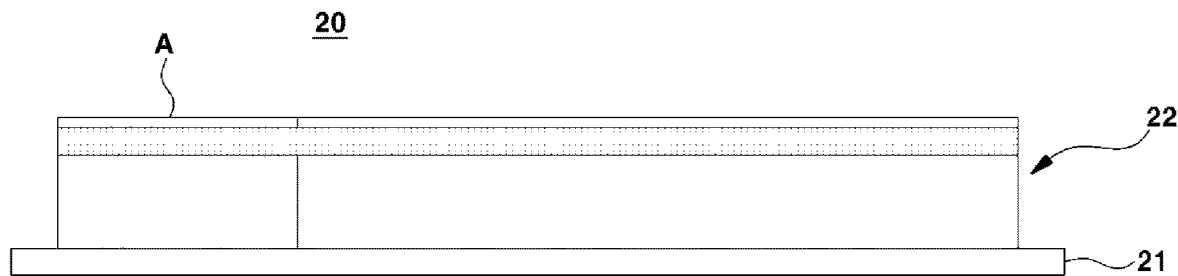
FIGS. 8A, 8B, 8C, and 8D are reference views illustrating a third embodiment of the method of manufacturing the electrolyte membrane for fuel cells according to the present disclosure.
Figure 8B:
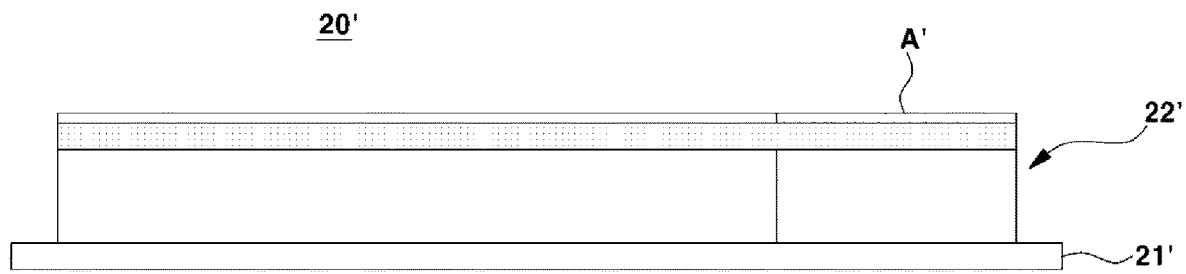

In addition, in order to obtain an electrolyte membrane 10 configured such that the catalyst regions A and A' are located at the same regions, the electrolyte membrane 10 may be manufactured using the following method. In this method, first, laminates 20 and 20' including a first ion transfer layer 22 having a catalyst region A formed at one side thereof, as shown in FIG. 8A, and a second ion transfer layer 22' having a catalyst region A' formed at the other side thereof, as shown in FIG. 8B, are prepared.

Figure 8C:
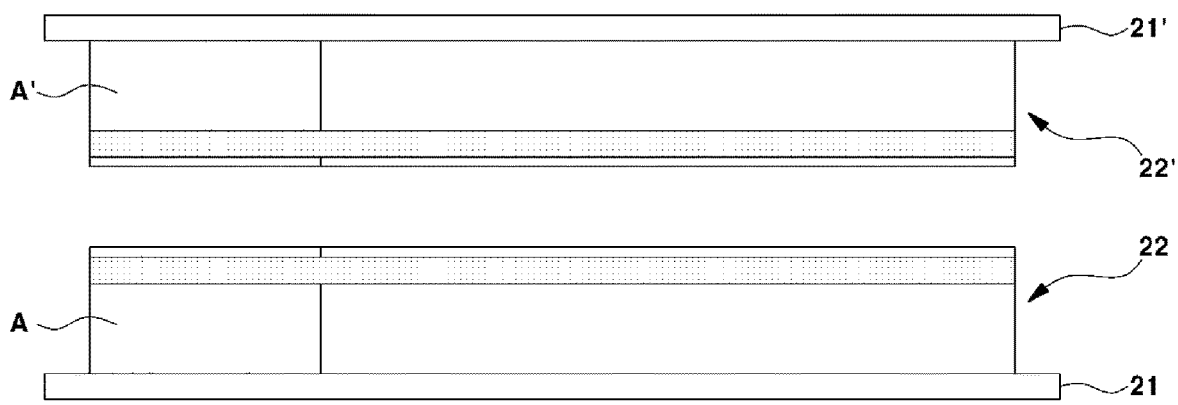
Figure 8D:
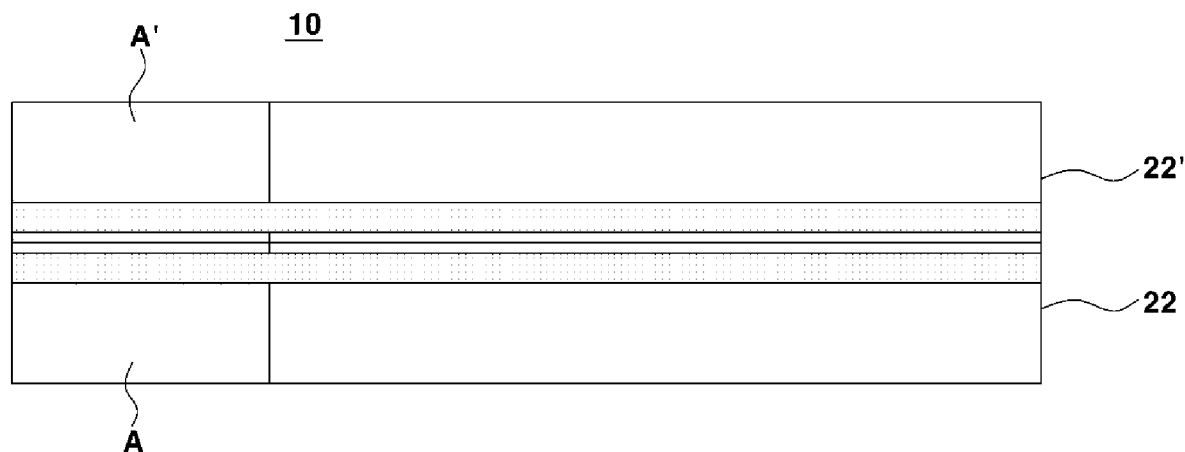

Subsequently, the laminates 20 and 20' may be located such that the ion transfer layers 22 and 22' face each other, as shown in FIG. 8C, and may be transferred while substrates 21 and 21' are removed to obtain an electrolyte membrane 10, as shown in FIG. 8D.

Referring to FIG. 8D, it can be seen that the catalyst regions A and A' of the electrolyte membrane 10 are located at regions oriented in the same direction.

A method of manufacturing a fuel cell according to the present disclosure may include forming electrodes on opposite surfaces of the electrolyte membrane 10 manufactured using the method shown in FIGS. 7A to 7D or 8A to 8D to obtain a membrane-electrode assembly and coupling the membrane-electrode assembly and a gasket to each other such that the catalyst regions A and A' of the electrolyte membrane 10 are located at hydrogen inlet and air inlet sides.

Figure 9A:
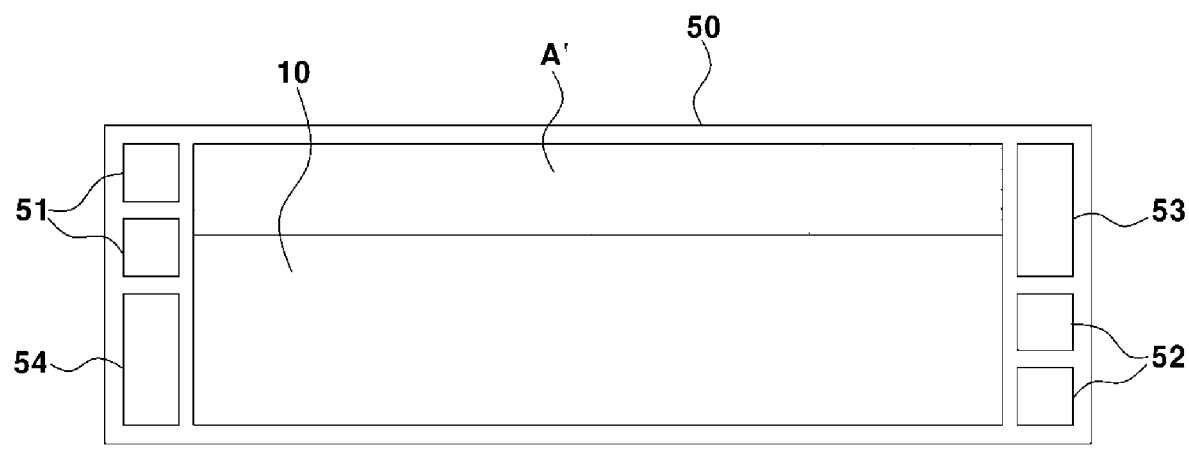
FIG. 9A is a plan view showing a fuel cell obtained using the electrolyte membrane manufactured according to the second embodiment or the third embodiment.
Figure 9B:
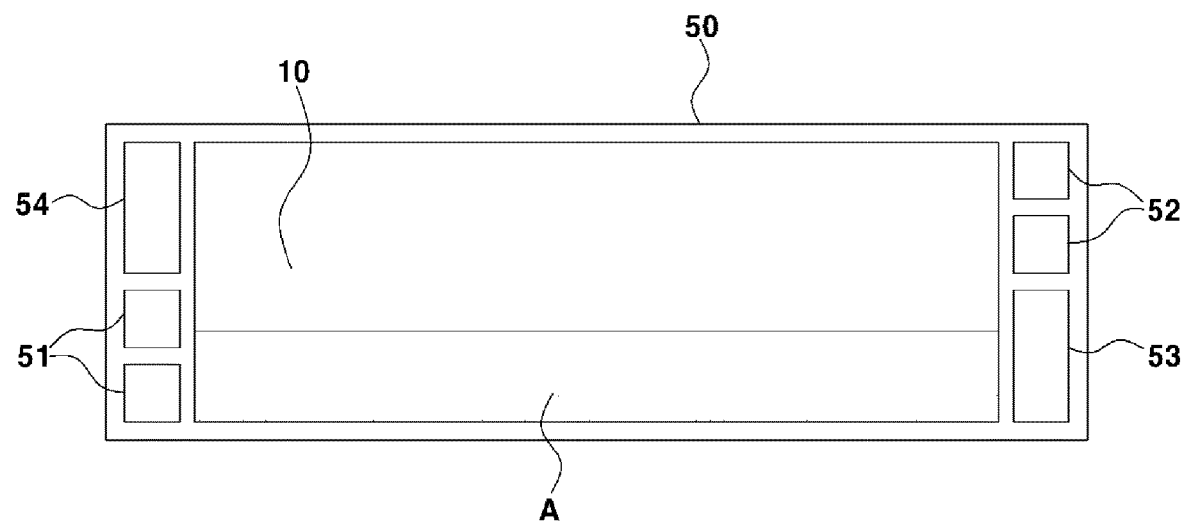
FIG. 9B is a bottom view of the fuel cell.

FIG. 9A is a plan view of the fuel cell, and FIG. 9B is a bottom view of the fuel cell. For convenience of description, the electrodes are omitted, and only the electrolyte membrane 10 and the gasket 50 are shown. Referring to FIG. 9A, it can be seen that the catalyst region A' is located at the hydrogen inlet 51 side. Referring to FIG. 9B, it can be seen that the catalyst region A is located at the air inlet 53 side.

In the fuel cell, the hydrogen inlet 51 and the air inlet 53 may be variously located and arranged depending on embodiments thereof. In the method according to the present disclosure, it is possible to manufacture various electrolyte membranes 10 using a single kind of laminate 20, whereby it is possible to flexibly correspond to a change in position and arrangement of the hydrogen inlet 51 and the air inlet 53.

Figure 10:
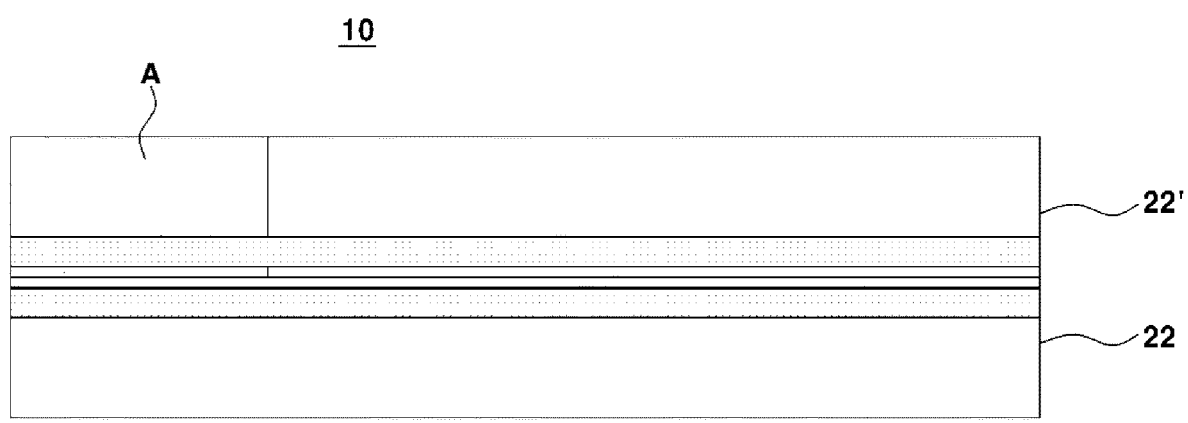
FIG. 10 is a sectional view showing another embodiment of the electrolyte membrane according to the present disclosure.

Meanwhile, in the case in which the electrolyte membrane 10 is applied to a low-output fuel cell having a small amount of gas that is transmitted, the catalyst region A may be formed at only one of ion transfer layers included in a pair of laminates, for example, an ion transfer layer 22, as shown in FIG. 10, whereby it is possible to reduce the amount of the catalyst that is used.

As is apparent from the foregoing, according to the present disclosure, it is possible to maintain durability of an electrode membrane so as to be equal to or higher than durability of a conventional electrode membrane while reducing the amount of a noble-metal-based catalyst, such as platinum, that is used, whereby it is possible to secure price competitiveness of products.

In addition, according to the present disclosure, it is possible to form various electrode membranes using an ion transfer layer obtained through one or two coating processes, whereby applicability thereof is excellent.

The effects of the present disclosure are not limited to those mentioned above. It should be understood that the effects of the present disclosure include all effects that can be inferred from the foregoing description of the present disclosure.

The embodiments of the present disclosure have been described with reference to the accompanying drawings. However, it will be apparent to those skilled in the art that the present disclosure may be embodied in specific forms other than those set forth herein without departing from the spirit and essential characteristics of the present disclosure. Therefore, the above embodiments should be construed in all aspects as illustrative and not restrictive.

The invention claimed is:

1. A method of manufacturing an electrolyte membrane for fuel cells, the method comprising:
    coating a slurry comprising at least an ionomer on a substrate to manufacture an ion transfer layer;
    manufacturing a laminate comprising the substrate and the ion transfer layer; and providing a pair of laminates to form the electrolyte membrane;

wherein the ion transfer layer has a catalyst region formed in at least one side based on a width-direction center line the catalyst region comprising a catalyst.

2. The method according to claim 1, wherein the catalyst region is formed from one end of the ion transfer layer to a boundary line apart from the one end toward the width-direction center line by a predetermined distance.

3. The method according to claim 1, wherein a width of the catalyst region is equal to or less than ½ of a width of the ion transfer layer.

4. The method according to claim 1, wherein the ion transfer layer is manufactured using a die coater, and a slurry comprising an ionomer and a catalyst is discharged through a portion of a nozzle of a die head provided in the die coater in order to form the catalyst region.

5. The method according to claim 1, wherein the catalyst comprises one element selected from a group consisting of: platinum (Pt), gold (Au), palladium (Pd), silver (Ag), osmium (Os), iridium (Ir), ruthenium (Ru), and a combination thereof.

6. The method according to claim 1, wherein the substrate comprises release paper selected from a group consisting of polyethylene terephthalate (PET), polyethylene naphthalate (PEN), polytetrafluoroethylene (PTFE), polyimide (PI), polypropylene (PP), and a combination thereof.

7. The method according to claim 1, wherein the pair of laminates is provided such that catalyst regions included in ion transfer layers are located at opposite regions in order to form the electrolyte membrane.

8. The method according to claim 1, wherein the pair of laminates is provided such that catalyst regions included in ion transfer layers are located at same regions in order to form the electrolyte membrane.

9. The method according to claim 8, wherein the laminates are wound around rolls, including an outer surface roll on which the ion transfer layer is wound so as to face outwards, and an inner surface roll on which the ion transfer layer is wound so as to face inwards are prepared, and the ion transfer layers contact each other, whereby the catalyst regions are located at the same regions.

10. The method according to claim 8, wherein a first ion transfer layer having a catalyst region formed at the one side based on the width-direction center line, and a second ion transfer layer having a catalyst region formed at an other side based on the width-direction center line are formed, and the first ion transfer layer and the second ion transfer layer are laminated so as to contact each other such that the catalyst regions are located at the same regions.

11. The method according to claim 1, further comprising providing a porous reinforcement layer on the ion transfer layer such that the ion transfer layer is impregnated with the reinforcement layer.

12. The method according to claim 11, wherein the reinforcement layer comprises one selected from a group consisting of polytetrafluoroethylene (PTFE), expanded polytetrafluoroethylene (e-PTFE), polyethylene (PE), polypropylene (PP), polyphenylene oxide (PPO), polybenzimidazole (PBI), polyimide (PI), polyvinylidene fluoride (PVdF), polyvinyl chloride (PVC), and a combination thereof.

13. A method of manufacturing a fuel cell, the method comprising:

forming electrode layers on opposite surfaces of the electrolyte membrane for fuel cells manufactured according to claim 1 to obtain a membrane-electrode assembly; and coupling the membrane-electrode assembly and a gasket to each other such that catalyst regions of the electrolyte membrane are located at hydrogen inlet and air inlet sides.

* * * * *